United States Patent [19]
Powell
[11] Patent Number: 4,685,128
[45] Date of Patent: Aug. 4, 1987

[54] METHOD AND NETWORK FOR TRANSMITTING ADDRESSED SIGNAL SAMPLES FROM ANY NETWORK INPUT TO AN ADDRESSED NETWORK OUTPUT

[75] Inventor: Jon N. Powell, Lewisville, Tex.
[73] Assignee: Thomson Components-Mostek Corp., Carrollton, Tex.

[21] Appl. No.: 686,314
[22] Filed: Dec. 24, 1984
[51] Int. Cl.$^4$ ..... H04Q 3/42
[52] U.S. Cl. ..... 379/272; 340/825.03
[58] Field of Search ..... 179/18 GF, 18 EA; 340/825.8, 825.02, 825.03, 146.2, 826; 370/58, 66; 379/272, 273, 292

[56] References Cited

U.S. PATENT DOCUMENTS

| | | | |
|---|---|---|---|
| 3,428,946 | 2/1969 | Batcher | 340/146.2 |
| 3,435,417 | 3/1969 | Haselton, Jr. | 340/825.8 |
| 3,593,295 | 7/1971 | Joel, Jr. | 340/825.02 |
| 3,638,193 | 1/1972 | Opferman et al. | 307/113 |
| 3,694,580 | 9/1972 | Inoise et al. | 370/68 |
| 3,963,872 | 6/1976 | Hagstrom et al. | 379/245 |
| 3,976,845 | 8/1976 | Ashley | 340/825.89 |
| 4,075,608 | 2/1978 | Koenig | 340/825.8 |
| 4,186,277 | 1/1980 | Schlichte | 370/58 |
| 4,307,466 | 12/1981 | Barton et al. | 364/200 |
| 4,351,985 | 9/1982 | Schlichte et al. | 340/826 |

*Primary Examiner*—Thomas W. Brown
*Attorney, Agent, or Firm*—Roland Plottel

[57] ABSTRACT

An address (n) is associated with a sort element (30) so that input signals are compared with each other, or with the address (n) in the case of a null input (N). Several elements (30) are interconnected to provide unique signal routing from any input to a particular output, depending upon a characteristic of an input signal itself without reference to other input signals.

7 Claims, 7 Drawing Figures

BUFF
BUFF
MUX
MUX
MUX
MUX
=Ø?
=Ø?
(n)

CONTROLLER
100
98
90
91
92
93
94
95
96
I
II
III
IV
V
VI
VII
VIII
30a
30b
30c
30d
30e
30f
30g
30h
30i
30j
30k
30l
30m
30n
30o
30p
30q
30r
30s
30t
30u
30v
30w
30x
30y
30z
30aa
30bb

METHOD AND NETWORK FOR TRANSMITTING ADDRESSED SIGNAL SAMPLES FROM ANY NETWORK INPUT TO AN ADDRESSED NETWORK OUTPUT

CROSS REFERENCE TO RELATED APPLICATIONS

Cross reference is made herein to copending, commonly-owned U.S. patent application Ser. No. 682,180, entitled ROUTING ELEMENT, filed on even date herewith by Powell.

DESCRIPTION

1. Technical Field of the Invention

The invention relates to circuits for routing signals to specific lines, based on the address of each signal.

2. Background of the Invention

In order to route phone conversations from one of many phones on a network to any other phone on that network it is typical to go through a central switching system which works as a large 'cross-bar' to connect any two phone lines together for a conversation. Modern techniques employ a digitized form of data transferal with many conversations 'time-multiplexing' the same wire. The size of the switching system is often limited by the speed at which the network can change configuration to meet the time-multiplexing demands of the input signals. Switching crossbars are usually made from large analog switch nets where the complete configuration of the net is changed by the control computer every time-slice. Recent VLSI developments have enabled the production of a crossbar which works through storing the conversations, temporarily, in a large dual-port memory array. The conversations are read into the appropriate locations as they come into the network and then read out in sorted order to their destination wires. The conversation capacity of this system is limited by the access time of the memory used.

DISLCOSURE OF THE INVENTION

It is an object of this invention to throughput signals to specific lines based on a characteristic of the signal, such as a digital address, using simple circuit elements.

According to the invention, sort circuit elements are arrayed so as to throughput a signal from any of a number of inputs to a specific output based on a signal characteristic, such as an address header on a digital byte. Each element has two inputs, a "low" and a "high" output, and an internal address. The characteristic of two input signals are compared in the circuit element; the signal having the greater characteristic is throughput in the "high" output and the signal having the lesser characteristic is throughput to the "low" output. In the case of only one input signal, it is compared with the element's internal address and throughput to the "low" output if it is less than or equal thereto. Otherwise it is throughput to the "high" output.

Other objects, features and advantages of the invention will become apparent in light of the following description thereof.

BEST MODE FOR CARRYING OUT THE INVENTION

Figure 1:
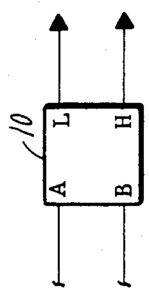
FIG. 1 is a block diagram of a prior art sort element.

FIG. 1 discloses a prior art bubble sort element 10 that compares the magnitude of signals impressed upon two inputs (A) and (B), and throughputs the signal of lesser magnitude to a "low" output (L) and the signal of the greater magnitude to a "high" output (H). In the context of digital signals, the addresses of address-bearing data are compared by the element 10. The data bearing the lesser address is throughput to the "low" output (L), and the data bearing the greater address is throughput to the "high" output (H). In the case of only one input signal, the other input is null (N), and the input signal will be throughput to the "high" output (H) since it is ipso facto of greater magnitude.

Figure 2:
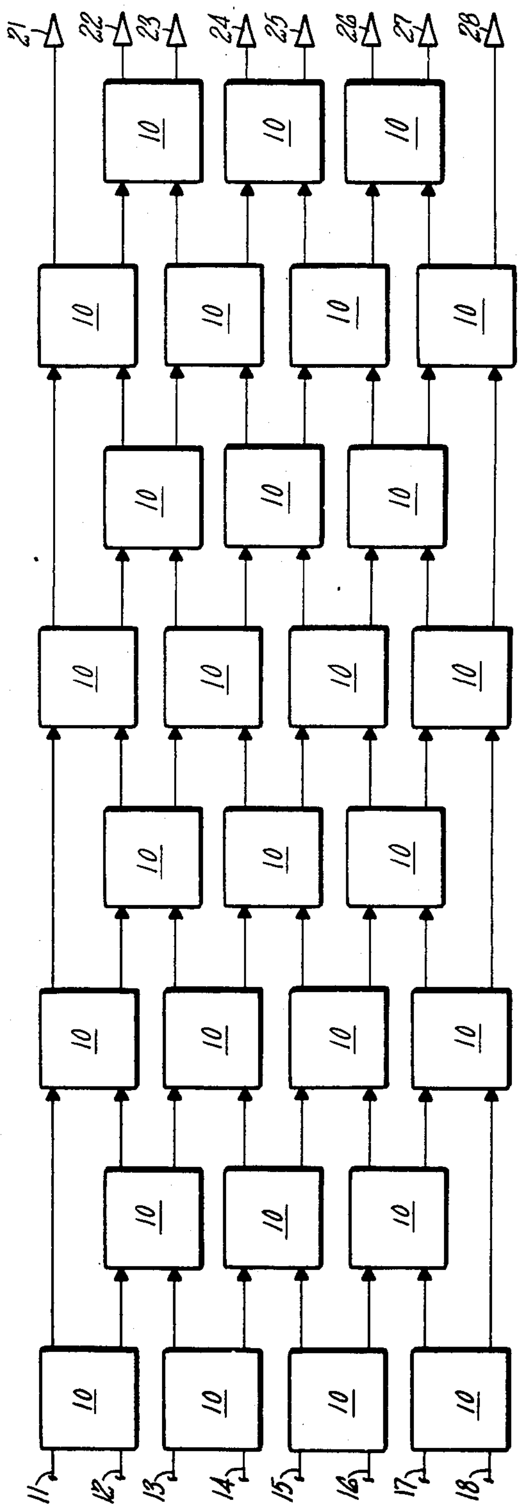
FIG. 2 is a schematic block diagram of several prior art sort elements, interconnected to perform a prior art technique.

It is known to interconnect several elements 10 so that more than two signals can be sorted according to their relative magnitudes. For instance, in the generalized scheme shown in FIG. 2, elements 10 are arrayed in a "brick-wall" structure so that signals presented to the inputs 11–18 are sorted according to magnitude at the outputs 21–28. The input signal having the greatest magnitude is sorted to the "highest" output 28, the signal having the next lower magnitude to the output 27, the signal having the next lower magnitude to the output 26, and so forth, filling the outputs 21–28 with sorted signals. Other interconnection techniques for achieving the same function are disclosed in U.S. Pat. Nos. 3,428,946 (Batcher, 1969), entitled MEANS FOR MERGING DATA; 3,593,295 (Joel, 1971), entitled REARRANGEABLE SWITCHING NETWORK; and 4,351,985 (Schlichte, et al., 1982), entitled COUPLING SYSTEM FOR A TELECOMMUNICATION EXCHANGE INSTALLATION.

In the case of null inputs (N)—in other words, fewer than all of the inputs having signals impressed thereon—the signals are sorted to the higher numbered outputs since the null inputs will "rise" to the lower numbered inputs. Thus, the output to which an input signal is sorted is dependent upon the contingency of null inputs (N). Because of this dependency, these sort techniques are not suited to "routing". For routing, the criterion is that input data be uniquely routed to a specific output, regardless of the input upon which it is impressed and whether there are null inputs (N). Nevertheless, sorting techniques provide a useful backdrop against which to highlight the invention.

MODIFIED BUBBLE SORT ELEMENT

Figure 3:
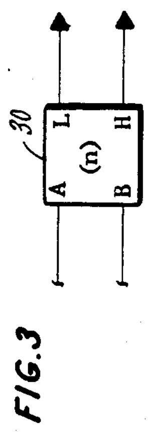
FIG. 3 is a block diagram of the sort element of this invention.

In FIG. 3 is shown a modified bubble sort element 30 that has an address (n) associated therewith. When address-bearing data (bytes) are presented to the inputs (A) and (B) of the element 30, the addresses of the bytes are compared, and the byte having the lesser address is throughput to a "low" output (L) and the byte having the greater address is throughput to a "high" output (H). In the case of only one input signal, the other input is considered null (N) and the comparison is made between the address of the byte and the element address (n). The byte is throughput to the "low" output (L) if its address is less than or equal to (n), or to the "high" output (H) if its address is greater than (n). The null input (N) is throughput to the other output. In the case of two null inputs (N), the outputs (L, H) are null.

Figure 4:
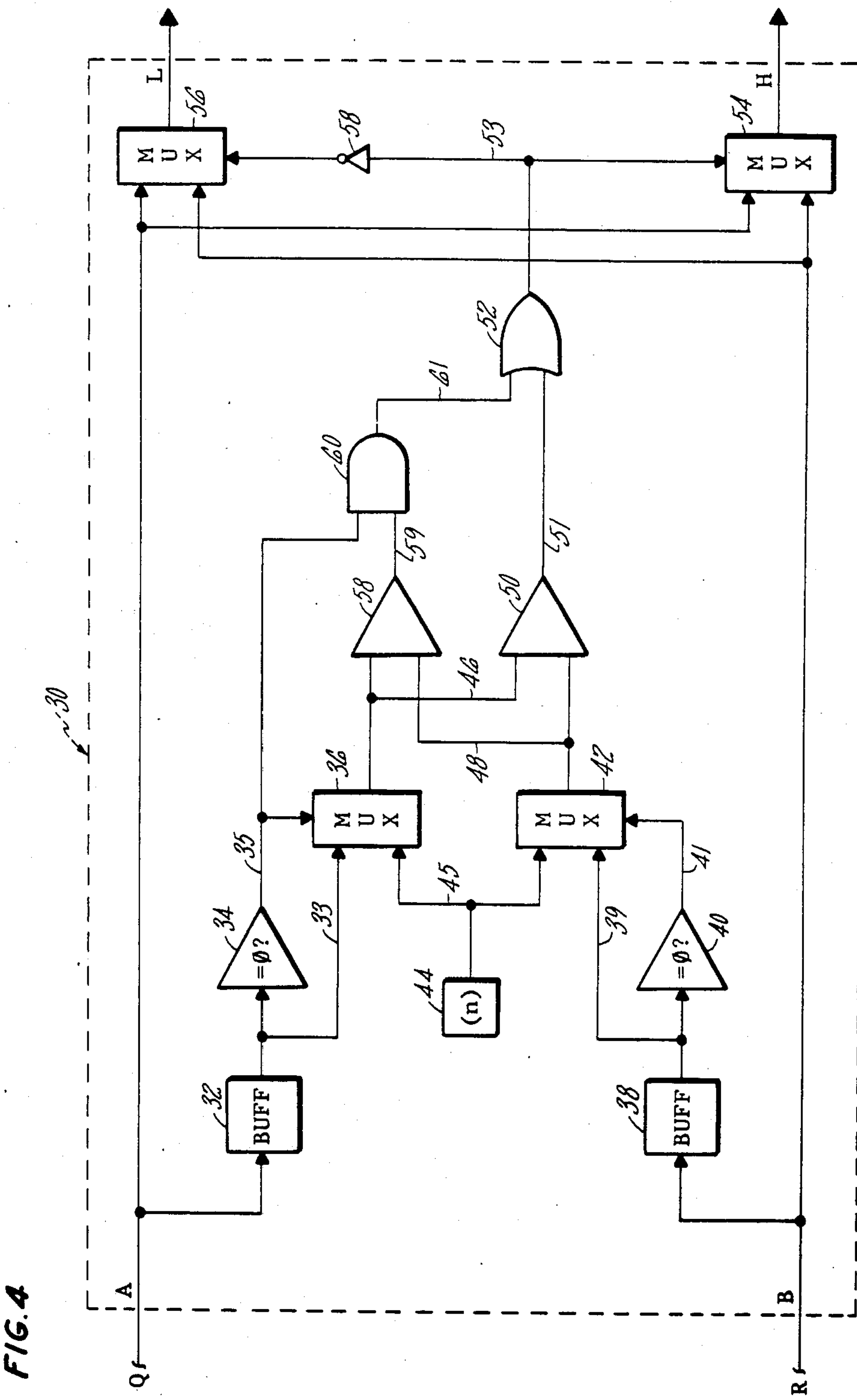
FIG. 4 is a schematic detailing the sort element of this invention.

FIG. 4 discloses a circuit for the element 30. A byte (Q), having address and data bits, is presented to the input (A). A similarly-sized byte (R) is presented to the input (B). A buffer 32 isolates the address of the byte (Q) and presents it on a line 33 to a value comparator 34 where it is compared to ZERO to test for a null input (N) on the input (A), in which case a logic ONE is provided on a line 35 to a multiplex switch 36. Similarly, a buffer 38 isolates the address of the byte (R) and presents it on a line 39 to a value comparator 40 where it is compared to ZERO to test for a null input (N) on the input (B), in which case a logic ONE is provided on a line 41 to a multiplex switch 42. It would be equivalent to locate the buffers 32, 38 in the lines 33, 39 respectively, so that the entire bytes were compared ZERO for non-input detection.

An address means, such as a constant generator 44 provides an address (n) on a line 45 to one input of each multiplexer 36, 42. The address means may also be hard wired, a dip-switch, or a ROM.

In response to the output of the comparator 34, the multiplexer 36 throughputs the address of the byte (Q) or, in the case of a null input (N) on the input (A), throughputs the stored address (n) to a line 46. Similarly, in response to the output of the comparator 40 the multiplexer 42 throughputs the address of the byte (R) or, in the case of a null input (N) on the input (B), throughputs the stored address (n) to a line 48. A comparator 50 is responsive to the throughputs of the multiplexers 36, 42 and provides a logic ONE on a line 51 to an OR gate 52 if the address on the line 46 is greater than the address on the line 48. The output of the OR gate 52 on a line 53 controls two multiplex switches 54 and 56, the latter via an inverter 58. These switches 54, 56 are operable to throughput the signals on the inputs (A) and (B) to the outputs (L) and (H) based on the output of the comparator 50. Therefore, if the address of the byte (Q) is less than the address of the byte (R); (A) is less than (B), the output of the comparator 50 is ZERO, the switch 56 throughputs the byte (Q) to the (L) output, and the switch 58 throughputs the byte (R) to the (H) output. For the case of (Q) greater than (R); (A) is greater than (B), the comparator 50 output is ONE, (R) or (N) is throughput by the switch 56 to (L), and (Q) is throughput by the switch 58 to (H).

In the case of a null input (N) on (A); if the address of the byte (R) on (B) is less than the internal address (n) the output of the comparator 50 is ONE so that (R) is throughput to the (L) output, and if the address of the byte (R) is greater than (n) the comparator 50 output is ZERO so that (R) is throughput to (H). In the case of a null input (N) on (B); if the address of the byte (Q) is less than or equal to the comparator 50 output is ZERO so that (Q) is throughput to (L), and if the address of (Q) is greater than (n) the comparator 50 output is ONE and (Q) is throughput to (H). A comparator 58 is also responsive to throughputs of the multiplexers 36, 42 and provides a logic ONE on a line 59 to an AND gate 60 if the address on the line 46 equals the address on the line 48. This can happen if both bytes (Q) and (R) have the same address, if both inputs (A) and (B) are null (N), or if one input is null and the address of the byte on the other input equals (n). If the input (A) is also null (n), a logic ONE is provided by the comparator 34 on the line 35 to the AND gate 60 so that a logic ONE is provided on a line 61 to the OR gate 52. This "overrides" the output of the comparator 50 for the case of two null inputs, so that (B=N) is throughput to (L) and (A=N) is throughput to (H). More importantly, for the case of a null input (N) on (A) and the address of the byte (R) equalling the internal address (n), it is important to the routing technique described hereinafter that (R) be throughout to (L). A truth table for the combinations of inputs and outputs is contained in the following TABLE.

TABLE

| CASE | 51 | L | H |
|---|---|---|---|
| A < B | 0 | A | B |
| A > B | 1 | B | A |
| A = B | 0 | A | B |
| A = B = N | 0 | B | A |
| A < n, B = N | 0 | A | B |
| A > n, B = N | 1 | B | A |
| A = n, B = N | 0 | A | B |
| B < n, A = N | 1 | B | A |
| B > n, A = N | 0 | A | B |
| B = n, A = N | 0 | B | A |

n = address of element
A,B = inputs to element
L = "low" output of element
H = "high" output of element
N = null input

ROUTING TECHNIQUE

Figure 5:
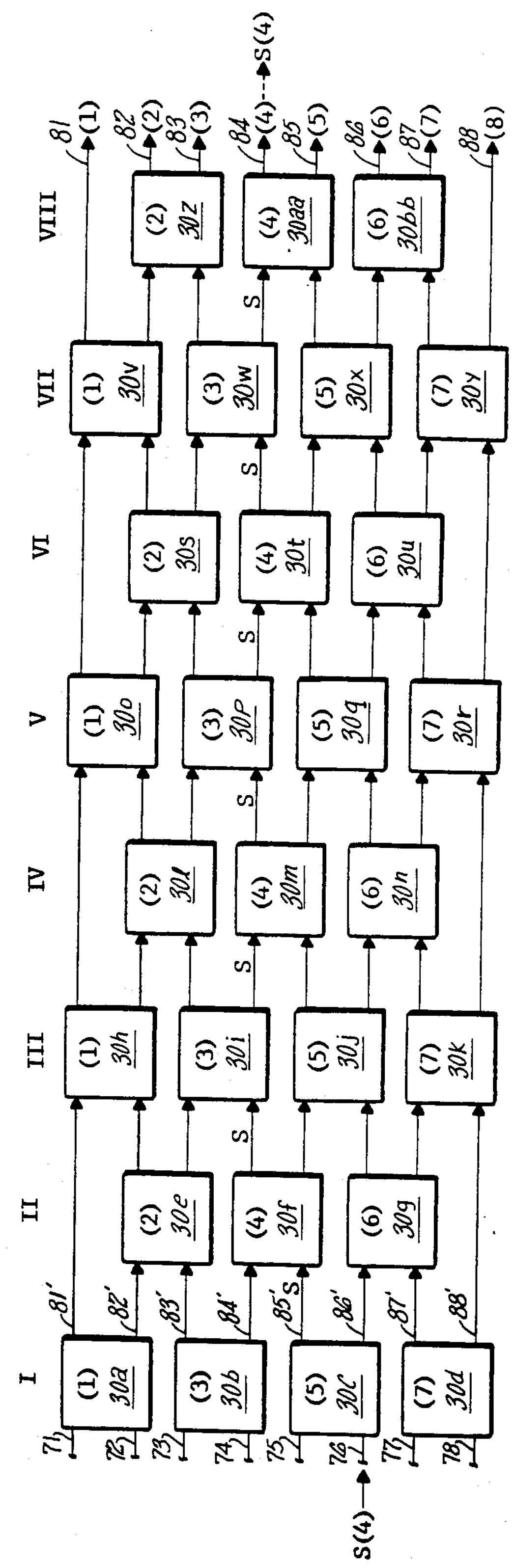
FIG. 5 is a schematic block diagram of several sort elements, according to FIG. 3 interconnected to perform the routing technique of this invention.

FIG. 5 shows a technique for interconnecting and addressing several elements 30 so that signals presented to the inputs 71–78 are uniquely routed to outputs 81–88 according to the value of a characteristic, such as their address. It will be noted that the interconnection of the elements 30 is identical to the interconnection of elements 10 in the generalized sorting technique discussed with reference to FIG. 2. The routing technique is discussed for eight inputs and eight outputs, but is applicable to routing more or fewer data.

Consider the case of one input data. In the sort technique of FIG. 2, the data would "sink" to the highest output 28 in the absence of other inputs, regardless of which input it is impressed upon. In the routing technique of FIG. 5, input data must be uniquely routed to a specific output, the address of which matches the address of the input data regardless of whether there is other input data.

The elements 30 are labeled 30*a*–30*bb* and their internal addresses (n) are in parentheses. The elements 30*a*, 30*h*, 30*o*, and 30*v* are addressed with a ONE (n=1); the elements 30*e*, 301, 30*s*, and 30*z* with a TWO (n=2); the elements 30*b*, 30*i*, 30*p*, and 30*w* with THREE (n=3); the elements 30*f*, 30*m* 30*t*, and 30*aa* with a FOUR (n=4); the elements 30*c*, 30*j*, 30*q*, and 30*x* with a FIVE (n=5); the elements 30*g*, 30*n*, 30*u*, 30*bb* with a SIX (n=6); and the elements 30*d*, 30*k*, 30*r*, and 30*y* with a SEVEN (n=7).

The outputs 81–88 are ordered, and correspond to address values 1–8, respectively. The object is that data bearing the address SEVEN, for instance, is routed to the outut 87, regardless of which input 71–78 it is impressed upon and whether there are signals on the other inputs.

The "brick wall" array of elements 30 involves eight routing stages (I–VIII). In the first stage (I), the four elements 30*a*–30*d* each receive a pair of the eight inputs 71–78 on their A/B inputs and route signals impressed thereon to their eight L/H outputs, which are signal lines 81'–88' that correspond in value to the outputs 81–88. It will be noted that in each stage, an element 30 can route a signal one line 81'–88' nearer to its ultimate destination 81–88.

The elements 30*c*–30*g* of stage II receive the lines 82'–87' in an ordered hierarchial manner for comparison of adjacent lines. There are three, rather than four elements at this stage, since it would be redundant to make the same four comparisions as in stage I. Comparisons are made between the H output of element 30*a* and the L output of the element 30*b*, between the H output of the element 30*b* and the L output of the element 30*c*, and between the H output of the element 30*c* and the L output of the element 30*d*.

In stage III the ordered outputs of stage II are compared in four comparisions of adjacent pairs of the lines 81'–88'. Stages IV, VI and VIII are akin to stage II and stages V and VII are akin to stages I and III so that the eight stages I–VIII accomplish the routing technique of this invention.

Consider the following example. A byte (S), bearing the address FOUR, is presented at the input 76 to the input (B) of the element 30*c*. All other inputs 71–75, 77–78 are null inputs (N). Since the address associated with the element 30*c* is FIVE, the byte (S) is routed to the "low" output (L), which is connected to the input (B) of the element 30*f* by the line 85'. The address of the element 30*f* is FOUR, so the byte (S) is routed to the "low" outpuL (L) on the line 84', which is connected to the input (B) of the element 30*i*. The address of the element 30*i* is THREE, so the byte (S) is routed to the "high" output (H) on the line 84', which is connected to the input (A) of the element 30*m*. The address of the element 30m is FOUR, so the byte (S) is routed to the "low" output (L) on the line 84', which is connected to the input (B) of the element 30*p*—and so on, as shown, until the byte (S) arrives at the output 84.

The routing technique is ideally suited to an even number (2X) of inputs/outputs, but could be adapted to an odd number.

The routing technique employs a high-bandwidth solution with O(n) latency and does not limit the number of input wires or restrict the number of conversations that can be made at any time (e.g. it is non-blocking).

Figure 6:
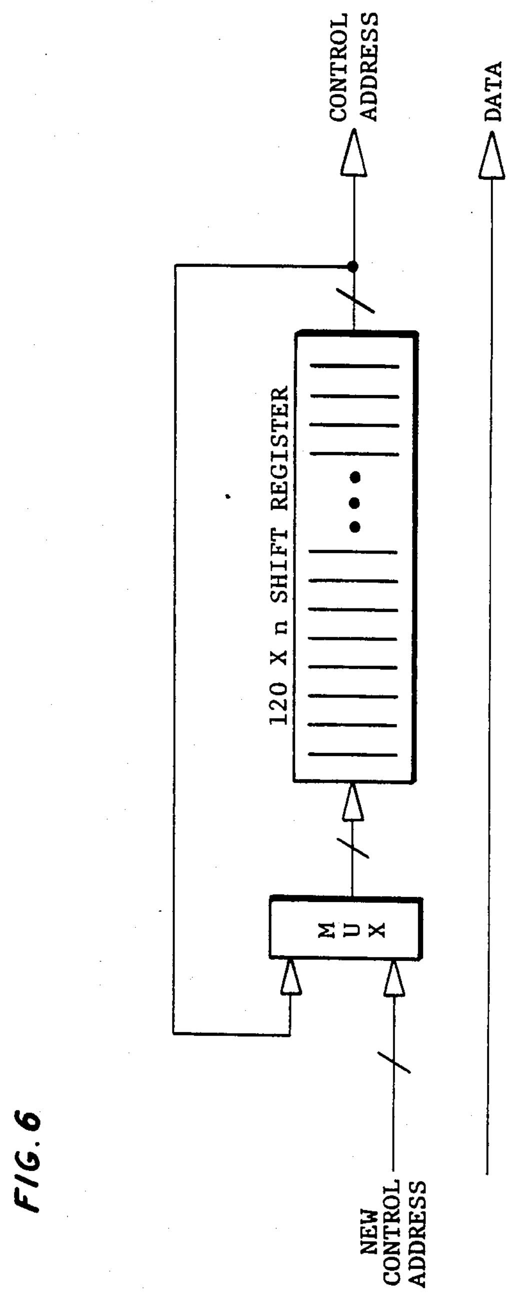
FIG. 6 is a schematic block diagram of a controller for use in conjunction with the routing technique of FIG. 5.

Control of the routing technique is reduced to inputting the correct destination address with each input datum. This problem could get complex except that the input of address is cyclic with the number of conversations multiplexed on a line. FIG. 6 shows a shift register controller which could be used to contain the address information for the data input line. The shift register need only be changed when a conversation is started or finished.

This design does not solve the problem of time-switching. That is, if two time-multiplexed signals attempt to go to the same output wire at the same input time-slot (regardless of the desired output time slot) this system will fail. However, the physical analog crossbar will also fail in the same way and it is known to place time-multiplexing units at either end of the crossbar to prevent time-data collision. The memory storage solution of this problem does not have this time-data collision problem since its implementation also time-sorts.

The routing technique is applicable to the routing of any high-bandwidth input data. It would be especially good as a terminal-to-computer data switch. The modular design of the routing technique lends itself to VLSI or perhaps wafer scale implementation, since the node design could be made fault tolerant and since redundant nodes can easily be added to the network.

Figure 7:
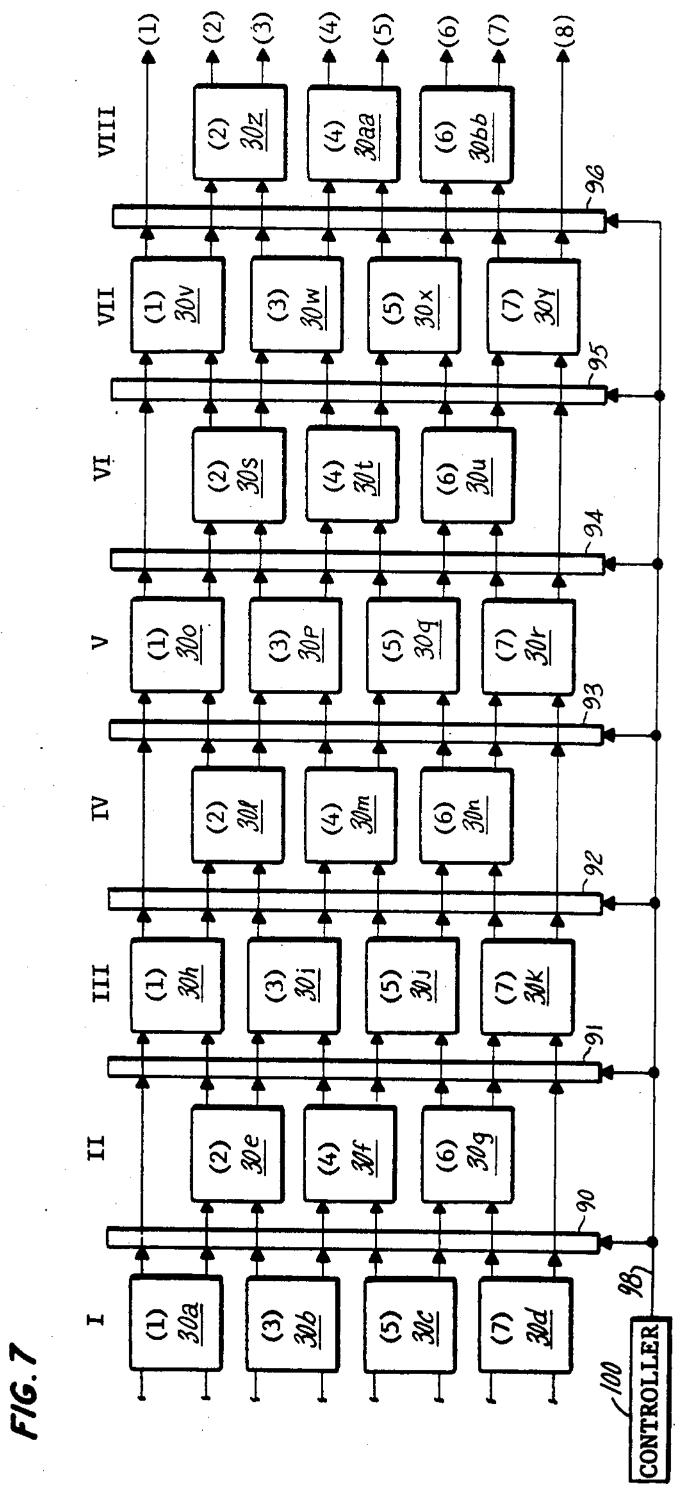
FIG. 7 is a schematic block diagram of a "pipelined" version of the routing technique of FIG. 5.

The routing technique described with reference to FIG. 5 is especially well suited to a pipelined configuration, such as is shown in FIG. 7. Therein, storage registers 90–96 are placed at the output of each stage (I–VII). The output of each stage is stored in the respective register until a signal on a line 98 from a controller 100 causes the registers 90–96 to throughput the signals to the next stage of the routing process. The throughput (bandwidth) of the system can be tailored thereby to a specific input rate, such as the standard 130 ns per bit input rate of phone lines. This method puts no constraints on the number of incoming phone lines and the only time penalty paid is O(n) latency on output, which is unimportant in this particular application.

It should be understood that various changes could be made to the invention without departing from the spirit and scope thereof.

What is claimed is:

1. A method for uniquely routing signals through a network from an even number (2X) of unordered inputs (71–78) to a particular one of 2X ordered outputs (81–88) based solely on the value of a characteristic of each signal, said outputs being ordered in accordance with associated values corresponding respectively to possible values of said characteristics of said signals and being respectively connected to ordered signal lines (81'–88') leading thereto and thereby respectively having the same as the outputs to which said signal lines respectively lead, comprising the steps of:

associating a range of values with the signal characteristics;

associating a range of values with the ordered outputs, commensurate with the range of signal characteristic values;

comparing the characteristic values of signals on adjacent inputs in nonoverlapping pairs of said inputs in a first set (i) of two-input comparison elements, X in number and each having stored therein a different value predetermined value (n) within said commensurate range of values, having two outputs and having means for selecting an output for transmission from an input in accordance with comparisons of two characteristic values of respective input signals, if present, with each other and with comparison of a characteristic value of any input signal present alone with said stored predetermined value (n), and, in response to said comparison, providing said input signals each through one of the two outputs of a said element onto one of two said ordered signal lines (81'–88') respectively connected to said two outputs of said element according to the relative values of the respective characteristics of said signals so that each signal is either put on a signal line having an associated value which is the same as the value of the signal characteristic or else is moved one line closer than another line connected to the same comparison element in order of associated value to a said ordered signal line (81–88) having associated thereto the same value as that of the signal characteristic;

in the case of absence (N) of a signal chracteristic on one input of an input pair connected to the same comparison element, assigning said predetermined value (n) stored therein as a signal characteristic to said one of the input pair and comparing the characteristic value of the signal on the other of the input pair with said predetermined value (n), said predetermined value (n) for each said element being selected according to one of respective values of the pair of values associated respectively with the pair of ordered signal lines (81′-88′) to which the outputs of the particular element are connected;

comparing the characteristic values of signals on said ordered signal lines (81′-88′) with each other and with predetermined values (n) stored in the respective elements using the same criteria as for the comparisons in said first set (I) elements in subsequent sets (II–VIII) of alternately X-1 and X elements constituted identically with said elements of said first set (I), each element of each said subsequent set of elements having its inputs connected to another portion of the same adjacently ordered signal lines as are connected respectively to its inputs, the lines of highest and lowest associated values being connected to elements of said set of X elements but not being connected to elements of said set of X-1 elements, and performing comparisons as aforesaid in sufficient subsequent sets of comparison elements to uniquely route each signal to the particular output having an associated value that equals the characteristic value of the signal.

2. The method of claim 1 characterized in that in each subsequent set of elements (II–VIII), characteristic values are compared for signals on adjacent pairs of ordered signal lines (81′-88′), which pairs are different from the pairs of ordered signal lines carrying pairs of signals of which the characteristic values are compared in the next previous set of elements (I–VII).

3. The method of claim 1 characterized in that the predetermined value (n) stored in a comparison element is chosen to correspond to the lesser of the values respectively associated with the pair of signal lines (81′-88′) by which input signals could possibly be provided to said element.

4. Apparatus for uniquely routing signals from a plurality of unordered inputs (71-78) to a particular one of a plurality of ordered outputs (81-88) on the basis of the values of addresses respectively characteristic of signals respectively impressed upon said inputs (71-78), said outputs being ordered in accordance with respective associated values each corresponding to an address value in a range of address values, comprising:

a plurality of circuit elements interconnected in a "brick wall" array, each circuit element having two inputs (A,B), a low output (L), a high output (H) and means for providing an internal address (n) in the form of a predetermined stored value for the element and constituted so that when two address-bearing signals are impressed respectively upon the two inputs (A,B) the signal having the greater address values is throughput to the high output (H) and the signal having the lesser address value is throughput to the low output (L), of said element, and when only one address-bearing signal is presented to the circuit element at an input (A,B), it is throughput to the low output (L) if its address is less than or equal to the predetermined internal address value (n) and is throughput to the high output (H) if its address value is greater than said predetermined internal address (n), and when no address bearing signal is presented to the circuit element both outputs are put in a condition (N) corresponding to absence of signal, said signal elements being interconnected in said "brick wall" array by ordered signal lines (81′-88′) leading respectively to said ordered outputs and into which said circuit elements are interposed in such a manner that except for the lowest and highest ordered lines of said ordered lines, the interposition of said circuit elements in each of said lines is, for successive elements interposed in the same line, alternately between a first input and a low output of an element and between a second input and a high outut of the next element, beginning with the first-mentioned kind of interposition in a first half (83′, 85′, 87′) of said lines and beginning with the second-mentioned kind of interposition in a second half (82′, 84′, 86′) of said lines interleaved with said first half of said ones, whereas in said lowest ordered and highest ordered lines, as the result of the "brick wall" nature of the array, a smaller number of said elements is interposed, and all of them are interposed in said lowest ordered line by connection to a first input and to the low output of each interposed element, and in said highest ordered line all of the interposed elements are interposed by connections to a second input and to the high output of each interposed element.

5. Apparatus according to claim 4, wherein timed buffer latches are interposed in said ordered lines between successive circuit elements interposed in said lines, and timing control means are connected to said buffer latches for timing the progress of signals from one element to the next in each of said lines, two of said buffer latches being interposed in said lines between successive interposed elements in said lowest ordered and highest ordered lines for equalizing the progress of signals through said array of circuit elements and said ordered lines.

6. Apparatus according to claim 4, wherein each of said ordered lines has a value associated therewith in accordance with the sequence of ordering of said lines (81′-88′) and of said outputs (81-88) and in which said predetermined stored value address of each element is determined by the lesser of the values respectively associated with the pair of said lines (81′-88′) in which the particular element is interposed.

7. Apparatus according to claim 5, wherein each of said ordered lines has value associated therewith in accordance with the sequence of ordering of said lines (81′-88′) and of said outputs (81-88) and in which said predetermined stored value address of each element is determined by the lesser of the values respectively associated with the pair of said lines (81′-88′) in which the particular element is interposed.

* * * * *